US008975559B1

(12) United States Patent
Keegan et al.

(10) Patent No.: US 8,975,559 B1
(45) Date of Patent: Mar. 10, 2015

(54) METHOD OF WELDING WITH ALUMINUM METAL-CORE WELD WIRE

(75) Inventors: James M. Keegan, Troy, OH (US);
Sundaram Nagarajan, Troy, OH (US);
Sushil R. Jana, Hanover, PA (US)

(73) Assignee: Hobart Brothers Company, Troy, OH (US)

( * ) Notice: Subject to any disclaimer, the term of this patent is extended or adjusted under 35 U.S.C. 154(b) by 1856 days.

(21) Appl. No.: 10/939,904

(22) Filed: Sep. 13, 2004
(Under 37 CFR 1.47)

Related U.S. Application Data

(60) Division of application No. 09/965,142, filed on Sep. 27, 2001, now Pat. No. 6,933,468, which is a continuation-in-part of application No. 09/685,106, filed on Oct. 10, 2000, now abandoned.

(51) Int. Cl.
*B23K 35/22* (2006.01)

(52) U.S. Cl.
USPC ............. 219/146.1; 219/145.1; 219/145.22; 219/146.22; 219/146.23; 219/146.24

(58) Field of Classification Search
USPC ............. 219/146.1, 145.1, 145.22, 146.22, 219/146.23, 146.24, 146.3, 146.31, 146.32, 219/146.41
See application file for complete search history.

(56) References Cited

U.S. PATENT DOCUMENTS

| | | | |
|---|---|---|---|
| 3,059,093 A * | 10/1962 | Norcross et al. ............. 219/74 |
| 3,645,782 A * | 2/1972 | Johnson ................... 219/146.41 |
| 3,676,309 A * | 7/1972 | Dolomont ...................... 205/50 |
| 3,787,658 A * | 1/1974 | Kammer et al. ......... 219/146.41 |
| 3,825,721 A * | 7/1974 | Carroll et al. ............ 219/146.52 |
| 4,035,892 A * | 7/1977 | Ototani et al. ................. 428/576 |
| 4,155,753 A | 5/1979 | Ryabchikov et al. |
| 4,314,136 A * | 2/1982 | Kotecki ................... 219/146.23 |
| 4,363,951 A | 12/1982 | Shiga |
| 4,449,031 A * | 5/1984 | Kotecki ................... 219/145.23 |
| 4,571,480 A | 2/1986 | Sakai et al. |
| 4,683,368 A * | 7/1987 | Das ........................... 219/146.1 |
| 4,698,095 A | 10/1987 | Ototani et al. |
| 4,752,442 A | 6/1988 | Asada et al. |
| 4,803,340 A | 2/1989 | Sato et al. |
| 4,804,818 A | 2/1989 | Andersen |
| 4,833,296 A | 5/1989 | Crockett et al. |
| 4,881,971 A | 11/1989 | Thom |
| 4,912,299 A * | 3/1990 | Oros et al. ............... 219/137 PS |
| 4,913,927 A | 4/1990 | Anderson |
| 5,008,074 A | 4/1991 | Naro et al. |
| 5,124,527 A | 6/1992 | Takano et al. |
| 5,124,529 A | 6/1992 | Nishikawa et al. |
| 5,132,514 A * | 7/1992 | Chai et al. ................. 219/145.22 |
| 5,260,540 A | 11/1993 | Kamimura et al. |
| 5,365,036 A | 11/1994 | Crockett et al. |
| 5,520,321 A | 5/1996 | Childree |
| 5,525,779 A | 6/1996 | Santella et al. |
| 5,545,247 A | 8/1996 | Andersson |
| 5,672,287 A * | 9/1997 | Masaie et al. ............ 219/145.22 |
| 5,782,955 A | 7/1998 | Sales et al. |
| 6,102,983 A | 8/2000 | Skaland |
| 6,608,284 B1 * | 8/2003 | Nikodym ............... 219/137 WM |

FOREIGN PATENT DOCUMENTS

| | | | | |
|---|---|---|---|---|
| EP | 0439179 | 7/1991 | | |
| FR | 2764905 | 12/1998 | | |
| JP | 54-99763 | 8/1979 | | |
| JP | 56163096 A * | 12/1981 | ........... | B23K 35/365 |
| JP | 06-83798 | 3/1994 | | |
| JP | 06-304780 | 11/1994 | | |
| JP | 07-96396 | 4/1995 | | |
| JP | 11104884 A * | 4/1999 | ............ | B23K 35/30 |
| JP | 2000-117486 | 4/2000 | | |

* cited by examiner

*Primary Examiner* — Alexandra Elve
(74) *Attorney, Agent, or Firm* — Thompson Hine L.L.P.

(57) ABSTRACT

Methods for forming an aluminum weld on an aluminum work surface are disclosed. The methods include providing an aluminum metal-core wire having a sheath with an outer surface and a core composition within the sheath, applying a voltage to the aluminum metal-core wire in the vicinity of the aluminum work surface to generate an arc, and melting the wire and the work surface to form the weld. The sheath is formed with an inorganic lubricant on its outer surface and the core composition includes metal powders, metal alloy powders, or combinations thereof and less than about 5% of non-metallic components or non-metallic agents based on the weight of the wire.

27 Claims, No Drawings

METHOD OF WELDING WITH ALUMINUM METAL-CORE WELD WIRE

CROSS-REFERENCE TO RELATED APPLICATION

This application is a division of U.S. application Ser. No. 09/965,142 filed Sep. 27, 2001 now U.S. Pat. No. 6,933,468, which in turn is a continuation-in-part of U.S. application Ser. No. 09/685,106 filed Oct. 10, 2000 now abandoned.

BACKGROUND OF THE INVENTION

The present invention relates to new and improved aluminum welding wire and more particularly to a metal-core aluminum welding wire which yields a high quality weld bead when used in welding components of aluminum articles.

Aluminum weld wire is conventionally provided as a solid wire that is generally produced by continuously casting round bars which are then heated to a temperature dependent on the alloy and rolled, for example, to ⅜ inch diameter. This rod is then drawn through a series of dies so that its diameter is reduced to the required size.

One of the problems that have been associated with weld deposits formed from aluminum weld wire is porosity. It is important that the weld beads be free of porosity. The porosity observed in aluminum welds has been attributed to a number of sources but one of the most prominent sources is voids caused by the release of hydrogen bubbles from the solidifying weld metal. These bubbles are caused by the introduction of hydrogen containing materials into the weld bead. During the welding, hydrogen-containing materials are decomposed and the hydrogen so produced dissolves in the molten metal. Upon solidification, the lower solubility of the hydrogen in the solid metal results in the rejection of hydrogen in solution and the production of small voids in the weld. It has been reported that hydrogen-containing materials may enter the weld bead from a number of sources but one of the principal sources is the welding wires themselves.

U.S. Pat. No. 3,676,309 discloses an aluminum base alloy welding wire, which is coated with an alumina-phosphate coating having a low rate of hydration such that essentially porosity free welds are obtained. The aluminum welding wire may be prepared by immersing the wire in a first aqueous alkaline solution containing an anode strip, continuously immersing the wire in a second aqueous alkaline solution containing a cathode strip, and passing an electric current through the electrolytes while the wire is immersed therein. Thereafter the wire may be rinsed in cold water, immersed in a passivating and neutralizing acid bath, and again rinsed. The second part of the process is an acid electrolytic treatment.

U.S. Pat. No. 4,913,927 discloses an aluminum weld wire having an ultra clean aluminum surface, lubricated with a dual coating of an essentially anhydrous lower alkanol and a colloidal solid lubricant.

Japan Patent Publication (OPI) 6-304780-A to Isuzu Motors Ltd. K.K. discloses an aluminum weld wire that is tubular and filled with a flux. According to the publication the flux contains 5-10% sodium, 40-45% potassium, 5% or less oxygen, 5% or less sulfur, 5-10% fluorines, and 35-40% chlorines.

SUMMARY OF THE INVENTION

One embodiment of the present invention is aluminum metal-core wire. Metal-core weld wires are generally composite tubular metal electrodes having a metal sheath and a core in which the core contains a core composition of various powdered materials. The term "metal-core" is used here in as it is used in the welding wire industry to refer to a core composition that contains primarily metallic alloying powders with low amounts (less than about 5%) of non-metallic agents that form slag on the weld deposit. For example, see ANSI/ANS A5.9 Specifications for Bare Stainless Steel Welding Electrodes and Rods. In a more particular embodiment of the invention, the aluminum metal-core weld wire comprises an aluminum sheath and a core composition containing less than about 5% non-metallic components based on the weight of the wire. The term "non-metallic" refers to elements that are not metals or metalloids; for example, it refers to hydrogen, carbon, nitrogen, oxygen, phosphorous, sulfur, selenium and the halides. The aluminum metal-core weld wire of the invention is useful for joint and surface welding. Some of the advantages of metal-core weld wire are better penetration into the base metal and better arc transfer characteristics (as compared to solid weld wire). Better arc transfer characteristics include better arc stability, lower spatter and better arc initiation. While steel metal-core weld wire is well known and widely used in the welding industry, aluminum weld wire has not been available commercially as a tubular metal-core wire.

In a more particular embodiment of the invention, the core composition contains manganese nitride and/or barium. By incorporating barium and/or manganese nitride in the core composition, less porous and in some cases essentially non-porous welds can be formed. Barium is believed to reduce porosity by dissolving hydrogen and thus preventing hydrogen from bubbling out of the weld upon solidification. Manganese nitride is believed to reduce porosity by releasing nitrogen upon welding. The nitrogen purges the hydrogen from the molten weld metal.

In manufacturing metal core wires, the core composition is blended and deposited onto a metal strip that is formed into a tube or sheath about the core composition in a forming mill. The sheath surrounding the core composition is drawn through reducing dies to a specified diameter. In order to perform the drawing operation, it is necessary to lubricate the outside surface of the sheath as it is pulled through the reducing dies. The lubricants that are conventionally used in forming steel tubular wire are organic and contain hydrogen. These lubricants are disadvantageous in forming aluminum metal core wire because the lubricants remain on the surface of the wire and break down during welding and release hydrogen. Unlike steel, molten aluminum has a high solubility for hydrogen. As a result, the released hydrogen readily dissolves in the molten aluminum weld deposit. When the weld deposit solidifies, the hydrogen is released and creates pores and channels in the weld rendering the weld unsuitable for most applications. In accordance with one embodiment of the present invention, this manufacturing difficulty is overcome by using an inorganic lubricant in the reducing dies. One lubricant of choice is molybdenum disulfide.

Another embodiment of the invention is a method for manufacturing aluminum metal-core wire which comprises the steps of depositing a metal core composition containing less than 5% nonmetallic elements (based on the total weight of the wire) onto a strip of aluminum, forming the strip of aluminum into a tube which contains the core composition, applying an inorganic lubricant to the surface of the tube, and drawing the tube through a plurality of reducing dies.

Another embodiment of the invention is an aluminum tube useful in forming an aluminum metal-core wire which comprises an aluminum sheath containing a core composition therein, wherein the outer surface of the aluminum sheath is coated with an inorganic lubricant and, more particularly in one embodiment of the invention, molybdenum disulfide. Another embodiment of the invention is a method for forming an aluminum tube useful in forming an aluminum metal-core wire wherein the formed sheath is cleaned in a bath of tetra-chloroethylene (TCE) and baked at a temperature between about 280-500° F. typically for about 1 to 4 hrs. to remove hydrogen containing materials such as moisture and TCE from the surface of the wire.

Still another embodiment of the invention is a method for forming an aluminum weld which comprises applying a voltage to an aluminum metal-core wire in the vicinity or a work surface to generate an arc which melts the electrode and the work surface and forms the weld.

In addition to providing aluminum metal-core wire containing a core composition, an aluminum metal core wire is also provided which consists of the hollow aluminum tube or sheath and no core composition. This wire is useful in applications where the advantages of a metal-core wire are desired but the core composition is not required to modify the weld composition.

DETAILED DESCRIPTION OF THE INVENTION

The aluminum metal core wire of the present invention is formed from an aluminum strip, which is formed into a tube. The aluminum strip that is used in the invention can be formed from aluminum or any of the aluminum alloys that are commercially available. The 4000 and 5000 series aluminum alloys (as classified by The Aluminum Association) are often used to form the strip. Two alloys that are particularly desirable for forming the strip are 5056 and 5052. The latter is characterized in that it contains 2.2 to 2.8% Mg and the former is characterized in that it contains 0.05 to 0.2% Mn, 4.5 to 5.6% Mg, and 0.02 to 0.2% Cr. Aluminum strip is available in a number of thicknesses. Strip 0.4 inch wide and 0.028 inch thick has been found to be suitable for use in one embodiment of the invention. In some embodiments of the invention it may be desirable to use thicker strip in order to increase the stiffness of the wire. In these embodiments it may be desirable to use strip about 0.039 inch thick. The aluminum strip that is used in one embodiment of the invention ranges from about 0.250 to 0.650 in. wide and about 0.010 to 0.040 in. thick.

The composition of the weld wire can be adjusted to provide the weld properties and/or to be compatible with the work piece in a manner that is known in the art. Many of these compositions have been assigned AWS numbers. Two of the most widely used aluminum weld wires are ER 5356 and ER 4043. These weld wires contain at least about 4% and more typically about 4 to 6% magnesium or silicon. In two of the embodiments, the weld wires of the invention are composed such that they meet the specifications for these wires.

In accordance with a more general embodiment of the invention, in addition to aluminum, the aluminum metal core wires of the present invention may contain one or more of the following elements (based on percent by weight of the wire):

TABLE 1

| | % |
|---|---|
| Si | 0-15 |
| Cu | 0-7.0 |
| Mn | 0-1.5 |
| Mg | 0-5.5 |

TABLE 1-continued

| | % |
|---|---|
| Ti | 0-10 |
| Ba | 0-0.5 |

TABLE 2[1]

| | ER 4043 | ER5356 |
|---|---|---|
| Si | 4.5-6.0 | 0.25 max. |
| Fe | 0.8 max. | 0.4 max. |
| Cu | 0.3 max. | 0.1 max. |
| Mn | 0.15 max. | 0.05-0.20 |
| Mg | 0.1 | 4.5-5.5 |
| Cr | — | 0.05-0.20 |
| Ti | 0.2 max. | 0.06-0.20 |

[1] A number followed by the term "max." refers to the maximum permitted level of an impurity.

In addition to the metals shown in Tables 1 and 2, in accordance with industry standards, the wire may contain limited amounts of Zn, Va, Be, Sn, Si, Fe, Zr. Generally, these metals will not exceed 0.005 to 0.45%. As industry standards change and/or new standards are adopted, the compositions of the weld, the wire, the sheath and the core composition are easily adjusted to accommodate them.

In a more specific embodiment of the invention the wires include manganese nitride and/or barium. It is desirable to use barium and manganese nitride alone or in combination in an amount sufficient to provide a weld that is essentially non-porous. Manganese nitride can be used in an amount up to about 6% of the core composition and is usually used in an amount of about 1 to 6%. Barium can be used in an amount up to about 1.5% of the core and is usually used in an amount of about 0.1 to 1.5%. Barium is preferably added to the core as CalSiBar in an amount up to 10% by weight of the core and usually in an amount of about 1 to 10%.

The sheath composition useful in select embodiments of the invention, in addition to aluminum may contain one or more of the following elements in the approximate weight percent (based on the sheath), illustrated in Table 3:

TABLE 3

| | General | Typical |
|---|---|---|
| Si | 0-16.00 | 0-11 |
| Fe | 0-1.10 | 0-0.8 |
| Cu | 0-0.71 | 0-0.5 |
| Mn | 0-0.71 | 0.5 |
| Mg | 0-7.10 | 0-5.0 |
| Cr | 0-0.50 | 0-0.35 |
| Zn | 0-0.40 | 0-0.25 |
| Ti | 0-0.40 | 0-0.30 |

In the embodiments of the invention in which a core composition is used in the wire, the core composition can be adjusted, based on the sheath alloy composition, to provide a wire which meets the desired weld characteristics and more particularly meets one of the American Welding Society (AWS) classifications for aluminum electrodes and wires as published in AWS A5.10. The core composition in approximate weight % in one embodiment of the invention is illustrated in Table 4 (the "typical" formulations reflect AWS standards):

TABLE 4

Powder Core Composition (%)

|           | General  | Typical   |
|-----------|----------|-----------|
| Al powder | 0-100.00 | 75-95.00  |
| Si        | 0-4.0    | 0-4.0     |
| Ca        | 0-2.0    | 0-2.0     |
| Mn        | 0-6.0    | 0-1.60    |
| Zr        | 0-2.5    | 0-1.00    |
| Cr        | 0-3.33   | 0-.40     |
| Ti        | 0-10     | 0-3.00    |
| Ba        | 0-1.5    | 0-1.5     |

The core composition may be prepared using $K_3AlF_6$, Ca—Si, Mn—N, Zr—Si and/or CalSiBar alloys. These alloys have the compositions shown in Table 4 below:

TABLE 4

Alloy Compositions (%)

| Alloy  | Ca   | Si   | Fe   | N    | S    | O    | Mn  | Zr   | C    | Al   | Ba   |
|--------|------|------|------|------|------|------|-----|------|------|------|------|
| Ca—Si  | 31.5 | 62.5 | 5.5  | 0    | 0    | 0    | 0   | 0    | 0.50 | 0    | 0    |
| Mn—N   | 0    | 0    | 0    | 6.00 | .30  | .50  | Bal | 0    | 0    | 0    | 0    |
| Zr—Si  | 0    | 50.8 | 10.3 | 0    | 0    | 0    | 0   | 38.4 | 0.50 | 0    | 0    |
| CalSiBar | 17.1 | 57.6 | 8.16 | 0    | 0.39 | 0    | 0   | 0    | 0.50 | 1.06 | 15.5 |

The core composition, when it is present, generally constitutes about 6 to 25% total weight of the aluminum core wire and more typically about 7 to 9%. In some of the more typical embodiments of the invention, the powders and particles making up the core composition will have an average particle size of about 45 micron to 250 micron. Uniform distribution of the core composition in the drawn aluminum wire affords uniformity of the weld deposit.

Aluminum core wire can be manufactured using wire manufacturing equipment and conditions similar to those used in the manufacture of conventional metal core wire. Aluminum strip is drawn through forming rolls. The rolls typically include 3 pair of rolls having a forming groove therein which roll the strip into a "U" shaped tube. The tube is filled with the metal powder and formed to create a wire. The closing rolls typically have the following diameter sequence: 0.160 in 0.150 in 0.140 in and 0.130 in. The strip must be lubricated as it is moved through this forming die set but because so little of this lubricant remains on the surface of the wire after the downstream drawing operation, this lubricant can be a conventional lubricant such as a silicone oil like Dow Corning 200. The strip is generally run through the forming rolls at a rate of about 40 to 200 feet per minute and more typically at a rate of 44 fpm.

Downstream from the forming die, the strip is drawn through a series of reducing dies, typically about 7 to 8 dies which progressively become smaller in diameter from an initial diameter of about 0.146 inch to a final diameter of about 0.062 inch. In one case, these dies by diameter (inch) have the sequence: 0.146, 0.120, 0.109, 0.097, 0.082, 0.069, and 0.062. As the strip is drawn through the reducing dies it is lubricated with a hydrogen-free lubricant. In one embodiment of the invention the lubricant is molybdenum disulfide. In another embodiment it is tungsten disulfide. The rolled strip is generally drawn through the reducing dies at a rate of about 100 to 1000 feet per minute.

The invention will be illustrated in more detail by the following non-limiting examples:

Examples

Aluminum metal core weld wires were prepared using a 5056 aluminum alloy to form the sheath and the following core compositions:

TABLE 5

Core Compositions

| Ex. No.     | 1     | 2     | 3     | 4     | 5     | 6     |
|-------------|-------|-------|-------|-------|-------|-------|
| Al powder   | 78.00 | 87.00 | 86.00 | 80.00 | 92.00 | 77.00 |
| Ca/Si alloy | 2.00  | 0.00  | 2.00  | 2.00  | 2.00  | 0.00  |
| Ti          | 10.00 | 2.00  | 2.00  | 10.00 | 3.00  | 10.0  |
| Mn-N alloy  | 6.00  | 6.00  | 0.00  | 6.00  | 1.60  | 6.0   |

TABLE 5-continued

Core Compositions

| Ex. No.     | 1      | 2      | 3      | 4      | 5      | 6      |
|-------------|--------|--------|--------|--------|--------|--------|
| Zr/Si alloy | 1.00   | 1.00   | 1.00   | 1.00   | 1.00   | 1.00   |
| Cr          | 1.00   | 1.00   | 1.00   | 1.00   | .40    | 0.00   |
| Silicon     | 0.00   | 1.00   | 0.00   | 0.00   | 0.00   | 0.00   |
| KAlF        | 2.00   | 2.00   | 2.00   | 0.00   | 0.00   | 0.00   |
| Mn          | 0.00   | 0.00   | 6.00   | 0.00   | 0.00   | 0.00   |
| Ba/Si       | 0.00   | 0.00   | 0.00   | 0.00   | 0.00   | 6.00   |
| Total       | 100.00 | 100.00 | 100.00 | 100.00 | 100.00 | 100.00 |

The best weldability with minimum porosity was obtained with Examples 5 and 6. Examples 1-3 exhibited some porosity. Example 4 exhibited no porosity.

Having described the invention in detail and with reference to specific embodiments thereof, it will be apparent that numerous modifications and variations are possible without departing from the scope of the invention as defined by the following claims.

What is claimed is:

1. A method for forming an aluminum weld on an aluminum work surface, the method comprising:
   providing an aluminum metal-core wire having a sheath with an outer surface and a core composition within the sheath, being formed with an inorganic lubricant on its outer surface, the core composition including metal powders, metal alloy powders, or combinations thereof and including less than about 5% of non-metallic components or non-metallic agents based on the weight of the wire;
   applying a voltage to the aluminum metal-core wire in the vicinity of the aluminum work surface to generate an arc; and
   melting the wire and the work surface to form the weld.

2. The method of claim 1, wherein the sheath is aluminum or aluminum alloy.

3. The method of claim 2, wherein, in addition to aluminum, the wire contains in approximate weight percent:

| | |
|---|---|
| Si | 0-15 |
| Cu | 0-7.0 |
| Mg | 0-6.0 |
| Mn | 0-1.5 |
| Ba | 0-0.5. |

4. The method of claim 2, wherein, in addition to aluminum, the wire contains in approximate weight percent:

| | |
|---|---|
| Si | 0-15 |
| Cu | 0-7.0 |
| Mg | 0-6.0 |
| Mn | 0-1.5. |

5. The method of claim 2, wherein, in addition to aluminum, the wire contains in approximate weight percent:

| | |
|---|---|
| Si | 0-15 |
| Cu | 0-7.0 |
| Mg | 0-6.0 |
| Ba | 0-0.5. |

6. The method of claim 2, wherein the weld wire contains magnesium or silicon in an amount of at least 4% by weight of the wire.

7. The method of claim 6, wherein, in addition to aluminum, the wire contains in approximate weight percent:

| | |
|---|---|
| Si | 4.5-6.0 |
| Fe | 0.8 max. |
| Cu | 0.3 max. |
| Mn | 0.15 max. |
| Mg | 0.1 |
| Ti | 0.2 max. |

8. The method of claim 2 wherein, in addition to aluminum, the wire contains in approximate weight percent:

| | |
|---|---|
| Si | 0.25 max. |
| Fe | 0.4 max. |
| Cu | 0.1 max. |
| Mn | 0.05-0.20 |
| Mg | 4.5-5.5 |
| Cr | 0.05-0.20 |
| Ti | 0.06-0.20. |

9. The method of claim 2, wherein the sheath is formed from a 4000 or 5000 series aluminum alloy.

10. The method of claim 9, wherein the sheath is formed from a 5052 or 5056 aluminum alloy.

11. The method of claim 2, wherein the core composition contains in approximate weight percent:

| | |
|---|---|
| Al powder | 0-100.00 |
| Si | 0-4.0 |
| Ca | 0-2.0 |
| Mn | 0-6.0 |
| Zr | 0-2.5 |
| Cr | 0-3.33 |
| Ti | 0-10 |
| Ba | 0-1.5. |

12. The method of claim 2, wherein the core composition contains in approximate weight percent:

| | |
|---|---|
| Al powder | 75-95.00 |
| Si | 0-4.0 |
| Ca | 0-2.0 |
| Mn | 0-1.60 |
| Zr | 0-1.00 |
| Cr | 0-.40 |
| Ti | 0-3.00 |
| Ba | 0-1.5. |

13. The method of claim 1, wherein the core composition contains barium.

14. The method of claim 13, wherein the core composition contains up to 1.5 wt % barium.

15. The method of claim 1, wherein the core composition contains a powder of a barium-containing alloy.

16. The method of claim 15, wherein the barium-containing alloy is selected from the group consisting of BaSi or calcium-silicon-barium alloy.

17. The method of claim 1, wherein the core composition contains MnN.

18. The method of claim 17, wherein the core composition contains about 1 to 6% MnN.

19. The method of claim 1, wherein the non-metallic components or non-metallic agents include elements that are not metals or metalloids selected from the group consisting of hydrogen, carbon, nitrogen, oxygen, phosphorous, sulfur, selenium and halides.

20. The method of claim 2, wherein the wire contains MnN in an amount of about 1 to 6% by weight based on the total weight of the wire or barium in an amount of about 0.1 to 1.5% by weight based on the total weight of the wire.

21. The method of claim 2, wherein the aluminum metal-core wire consists of a tubular sheath of aluminum or aluminum alloy.

22. The method of claim 2, wherein the core composition consists of metal powders, metal alloy powders, or combinations thereof.

23. A method for forming an aluminum weld on an aluminum work surface, the method comprising:
    providing an aluminum metal-core wire having a sheath with an outer surface and a core composition within the sheath, the core composition consisting of metal powders, metal alloy powders, or combinations thereof and consisting of less than about 5% of non-metallic components or non-metallic agents based on the weight of the wire;
    applying a voltage to the aluminum metal-core wire in the vicinity of the aluminum work surface to generate an arc; and
    melting the aluminum metal-core wire and the aluminum work surface to form the aluminum weld.

24. The method of claim 23, wherein the sheath is aluminum or aluminum alloy.

25. The method of claim 23, wherein the sheath of the aluminum metal-core wire is an aluminum or aluminum alloy sheath and the core composition further comprises silicon metal, a silicon alloy, or combinations thereof.

26. The method of claim 25, wherein the silicon alloy is selected from the group consisting of calcium-silicon alloy, zirconium-silicon alloy, barium-silicon alloy, and combinations thereof.

27. The method of claim 25, wherein the core composition comprises aluminum powder present as about 75% to about 95% by weight of the core.

* * * * *